Patented Feb. 20, 1951

2,542,762

UNITED STATES PATENT OFFICE 2,542,762

PROCESS AND APPARATUS FOR SYNTHESIS OF MELAMINE

Henry L. Forbes, Jr., and Thomas H. Crim, Jr., Wilmington, Del., assignors to E. I. du Pont de Nemours & Company, Wilmington, Del., a corporation of Delaware No Drawing. Application August 13, 1946, Serial No. 690,331

1 Claim. (Cl. 260—249.5)

This invention relates to the synthesis of melamine and more particularly to processes for the manufacture of melamine by the pyrolysis of urea at elevated temperatures and pressures.

It has recently been discovered that melamine can be manufactured in excellent yield by pyrolysis of urea at temperatures of about 275° C. to 550° C. under superatmospheric pressure, preferably under pressures of about 400 to 1000 atmospheres. It has also been observed that at temperatures of about 385° C. to 550° C., under pressures of about 400 to 1000 atmospheres urea is converted to melamine in virtually quantitative yields even when the reaction time is no greater than about 3.5 minutes (cf. copending applications S. N. 504,164, filed by D. J. Loder, September 28, 1943; S. N. 580,254, filed by W. F. Gresham, A. T. Larson, and D. J. Loder, February 28, 1945, and S. N. 657,536, filed by W. F. Gresham, A. T. Larson, and D. J. Loder, March 27, 1946). In the manufacture of melamine from urea by the method described in the said copending applications the apparatus preferably employed in the urea pyrolysis step was a silver-lined tubular converter. Other materials of construction which could be employed as liners for the urea pyrolysis apparatus, according to the above-mentioned disclosures, were glass and certain metals such as silver-platinum alloy, Inconel, etc. However, the aforesaid materials of construction have certain disadvantages. In particular, it has been found that virtually all of the commonly available metals are either very rapidly attacked by the reaction mixture at the temperatures and pressures required for the rapid conversion of urea to melamine or else they have such a low strength at the preferred temperatures that frequent leaks or ruptures occur.

An object of this invention is to provide an improved process for the manufacture of melamine from urea at elevated temperatures and pressures. A further object is to provide a process for the synthesis of melamine from urea which does not require unduly frequent replacement of the metallic liner which is employed in the urea pyrolysis vessel. A still further object is to provide a material of construction for urea pyrolysis converters which will permit the pyrolysis of urea to melamine to be carried out without frequent replacement of the reaction vessel, so that the process can be operated for sufficiently long periods of time, without interruption, to make the manufacture of melamine by a pyrolysis of urea commercially feasible.

These objects have been accomplished in accordance with this invention by heating urea at melamine-forming temperatures and pressures in a reaction vessel lined with a platinum-ruthenium or platinum-iridium alloy containing about 90% to 98% by weight of platinum, and thereafter separating melamine from the resulting reaction mixture. The preferred liners contain about 95% of platinum and about 5% of either ruthenium or iridium.

The synthesis of melamine from urea in accordance with this invention may be carried out at a temperature of about 275° C. to 550° C., preferably 385° C. to 450° C. under superatmospheric pressure, in an apparatus made of or lined with the said alloys, best results being obtained at pressures above 200 atmospheres. When pressures of about 400 to 1000 atmospheres are employed, very rapid conversion of urea to melamine takes place without the formation of excessive quantities of insoluble by-products (cf. S. N. 657,536, filed March 27, 1946). It is frequently desirable, in practicing the invention, to employ at least a slight excess of ammonia over the amount which is liberated from the urea during pyrolysis thereof to melamine, since the ammonia not only lowers the melting point of urea (facilitating the pumping thereof), but also assists in suppressing the formation of by-products. However, a very large excess of ammonia in the initial reaction mixture, (i. e., a molal ratio of $NH_3$:urea exceeding 20:1) is generally undesirable, in the practice of the invention, unless products rich in guanidine are desired.

Even the best materials of construction which have been employed heretofore as metallic liners for use in the urea conversion vessel have been found to develop serious flaws after only a few days of continuous use in the manufacture of melamine. Thus it has been observed that a reactor lined with silver or platinum-silver alloy developed leaks by extrusion of the liner flanges during the first few hours of continuous use in the conversion of urea to melamine. After the joints had been retightened a number of times, the flanges were thinned down to such an extent that they sheared off of the tube, thus making the liner unusable for further operations. Better results are obtainable with alloys in which platinum is the main constituent, such as platinum-gold, platinum-silver and platinum-nickel, containing up to about 20% of the metal which is alloyed with the platinum. Stainless steel tubes corroded rapidly, and frequently ruptured after only a few hours of exposure to the urea pyrolysis mixture. Monel metal also developed severe corrosion, and ruptured after about 69 hours of service. An experiment in which a solid nickel tube was employed in the urea pyrolysis vessel was interrupted after 22 hours of operation because of corrosion of the nickel tube to the point of rupture. Similar results were observed with Everdur, and with Hastelloy A. Inconel metal tubes also ruptured after prolonged use; in one instance an Inconcel tube ruptured after 38 hours exposure to the urea pyrolysis mixture at a temperature of 450° C. under a pressure of 400 atmospheres; in other experiments Inconel tubes ruptured after 10 hours of exposure at 400° C. and 800 atmospheres, and after 5 hours at 450° C., 600 atmospheres.

In contrast with the results obtained with other metallic liners and with solid tubing of other alloys, it has been observed in accordance with this invention that platinum-iridium and platinum-ruthenium alloys containing about 90% to 98% of platinum, the remainder of the said alloy being either iridium or ruthenium, may be employed as liners for the urea converter under the pyrolysis conditions without any noticeable corrosion whatever and without any serious flow or extrusion of the liner flange when subjected to pressure in the tubing joint and maintained at the synthesis temperature. In one instance, a liner containing 95% platinum and 5% ruthenium was used for 650 hours without serious corrosion. Reaction vessels having the said platinum-ruthenium or platinum-iridium liners, on the basis of the rate of corrosion in prolonged continuous runs, could be employed for many months of continuous operation without the necessity of replacing the said liner.

It is to be understood that the reaction vessels employed in accordance with this invention need not necessarily be tubular, but that any other suitable form of pyrolysis vessel may be employed. A simple relatively short tubular converter jacketed with molten lead or heated by a heat transfer salt circulated through a jacket is generally found to be highly satisfactory as a reaction vessel for the pyrolysis of urea to melamine in accordance with this invention. Other forms which may be employed include coils, U tubes, vertical towers, autoclaves (which may be employed in batchwise operation), internally braced cartridges, and the like.

Since many different embodiments of this invention may be made without departing from the spirit and scope thereof it is to be understood that we do not limit ourselves except as set forth in the following claim.

We claim:

The method for avoiding corrosion of a pressure-resistant reaction vessel employed in the synthesis of melamine by heating urea at a temperature of 385° to 550° C. under a pressure of 400 to 1000 atmospheres, which comprises carrying out the said synthesis in a reaction vessel lined with a platinum-ruthenium alloy containing from 90% to 98% by weight of platinum, said liner being in contact with melamine and molten urea in the synthesis mixture at the said temperature and pressure.

HENRY L. FORBES, JR.
THOMAS H. CRIM, JR.

REFERENCES CITED

The following references are of record in the file of this patent:

UNITED STATES PATENTS

| Number | Name | Date |
|---|---|---|
| 1,545,234 | Cohn | July 7, 1925 |
| 1,816,087 | Lidner | July 28, 1931 |
| 1,875,982 | Boller | Sept. 6, 1932 |
| 1,961,194 | Calcott | June 5, 1934 |
| 2,087,980 | Lawrence | July 27, 1937 |

FOREIGN PATENTS

| Number | Country | Date |
|---|---|---|
| 583,504 | Great Britain | Dec. 19, 1946 |

OTHER REFERENCES

Baker Chem. Co., "Platinum Metals and the Chem. Ind.," pp. 5, 8–11, 1939.